United States Patent [19]
Doyle et al.

[11] 3,990,506
[45] Nov. 9, 1976

[54] HEAT EXCHANGER

[76] Inventors: George H. Doyle, 824 Camino de Paz, El Paso, Tex. 79922; John R. Johnston, Star Rte. Box 1262, Corrales, N. Mex. 87048

[22] Filed: Jan. 20, 1975

[21] Appl. No.: 542,373

[52] U.S. Cl. .............................. 165/121; 165/164
[51] Int. Cl.² ........................................... F24H 3/02
[58] Field of Search.... 165/130, 131, 147, 154–155, 165/164, 183, 76, 165, 121; 126/110 B

[56] References Cited
UNITED STATES PATENTS

| | | | |
|---|---|---|---|
| 2,421,371 | 6/1947 | Budlane | 165/147 |
| 2,756,032 | 7/1956 | Dowell | 165/121 |
| 3,036,818 | 5/1962 | Legrand | 165/183 X |
| 3,507,324 | 4/1970 | Mueller | 165/164 |
| 3,584,682 | 6/1971 | Leedham | 165/164 |

Primary Examiner—Charles J. Myhre
Assistant Examiner—Theophil W. Streule, Jr.
Attorney, Agent, or Firm—William L. Scherer

[57] ABSTRACT

A heat exchanger comprising a novel design, construction and arrangement of readily formable separately sealed channels for the transmission therethrough of fluids to impart heat through conduction and convection from a heated fluid to a fluid to be heated and to be used for heating a work area of a building and the like.

2 Claims, 4 Drawing Figures

HEAT EXCHANGER

The present invention relates to a heat exchanger in which are disposed a number of heat transfer tubes of unique design carrying a supply of heated fluid, said tubes providing exposure of a maximum surface area to a supply of fluid to be heated thereby minimizing the temperature gradient and preventing cross contamination of the fluid media.

Heat exchangers are well known as a means for transferring heat from one fluid to another while preventing the two fluids from intermixing. It should be understood that although the term "air" is used in the description which follows, the invention applies equally well to the use of any fluid including liquids, vapors, gases and mixtures thereof.

In the normal heat exchanger, a heated supply of air such, for example, as that recovered from a manufacturing process is channeled through a series of tubular elements the outermost surfaces of which are exposed to the passage of an air supply to be heated. Heat transfer between the two air supplies is achieved by means of convection from the heated air to the tubular elements, then by conduction therethrough and finally by convection to the air to be heated.

The rate at which the heat is transferred from the surfaces of the tubular elements to the air to be heated is dependent upon a number of factors including the velocity, temperature difference and physical properties of the air supplies as well as the size, shape, arrangement and character of the surfaces of the tubular elements.

Thus, in the design and construction of heat exchangers it is desirable to provide a maximum surface contact of the air to be heated with the tubular elements carrying the hot air. To this end, the tubular elements of the heat exchanger of the present invention are constructed with spaced generally mirror-image segments or halves thereby greatly increasing the surface thereof and maximizing the heat dispersal properties. Additionally, the outer surfaces of the tubular elements have partially circumferentially extending corrugations at spaced intervals longitudinally thereof.

As a still further means of enhancing the turbulence or washing effect of the air to be heated with respect to the exterior surfaces of the tubular elements, a series of spoilers are provided secured in alternately spaced relation along the longitudinal dimension of the tubular elements.

One of the distinct advantages and, therefore, an object of the present invention, is to provide a heat exchanger which possesses all of the aforementioned attributes and yet is capable of being fabricated economically as well as being readily adapted to use in building construction.

Another object of the present invention is to achieve through the preferred design and construction of the heat exchanger unit a device which, while capable of assuring the maximum heat transfer properties, is capable of being cleaned readily by rodding so that any dirt, lint, grease or other foreign substances, can be readily removed therefrom and the efficiency of the unit maintained.

Other important objects and advantages of the present invention will become apparent as the following description with reference to the accompanying drawings of a preferred embodiment of the invention proceeds.

Figure 1:
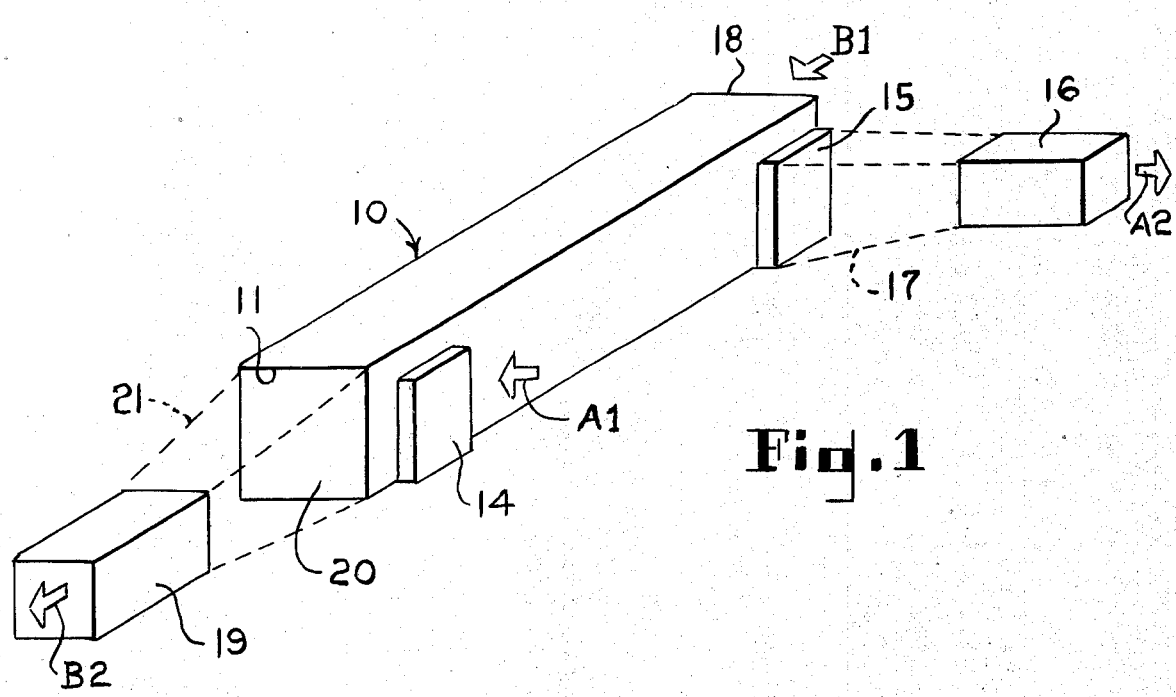
FIG. 1 is a partially schematic showing of the heat recovery unit embodying a plurality of end supported tubular elements enclosed therein as it may be employed in a system for heating a work area.
Figure 2:
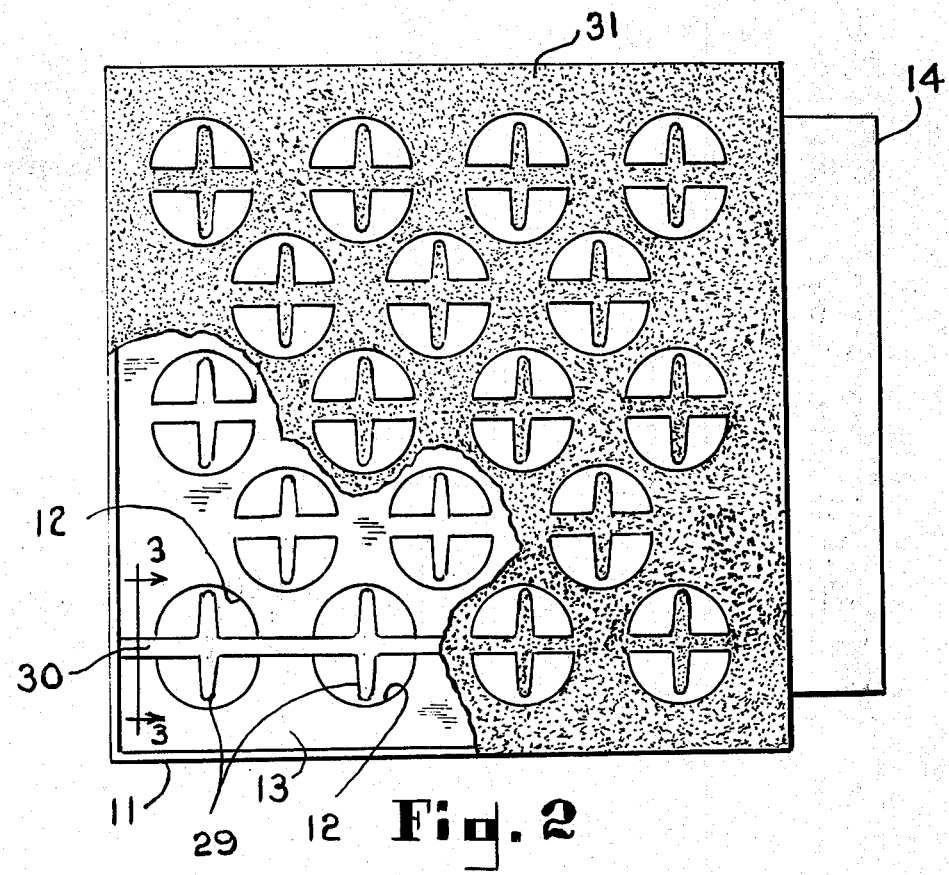
FIG. 2 is an enlarged end view of the heat recovery unit of FIG. 1 disclosing the plurality of mutually tubular elements therein as seen from one end thereof and with a portion broken away.

The air to air heat recovery unit of the present invention is identified generally by the reference numeral 10 in FIGS. 1 and 2 of the drawing. The unit 10, also known as a heat exchanger, comprises an outer shell 11 of substantially rectangular cross-section. As will be readily apparent from the enlarged end view of the unit 10 in FIG. 2, there are a number of substantially tubular elements 12 arranged within and with their longitudinal axes in mutually parallel relation to the longitudinal dimension of the outer shell 11.

Figure 3:
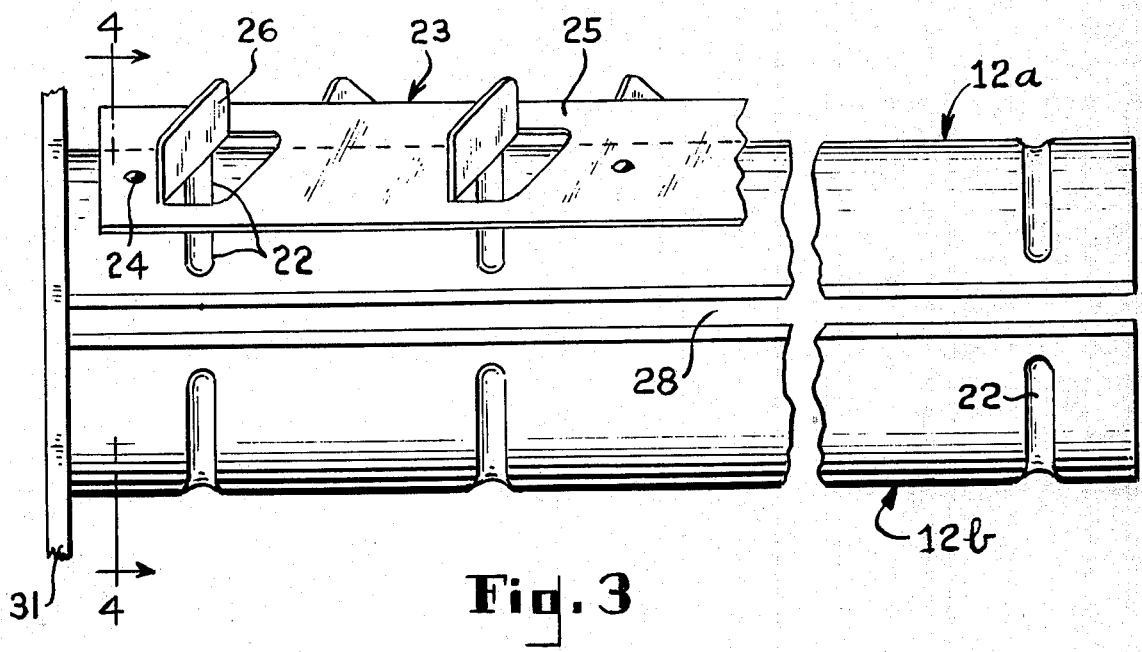
FIG. 3 is an enlarged view of one of the tubular elements taken generally along the line 3—3 in FIG. 2 with the lower spoilers omitted and portions broken away.
Figure 4:
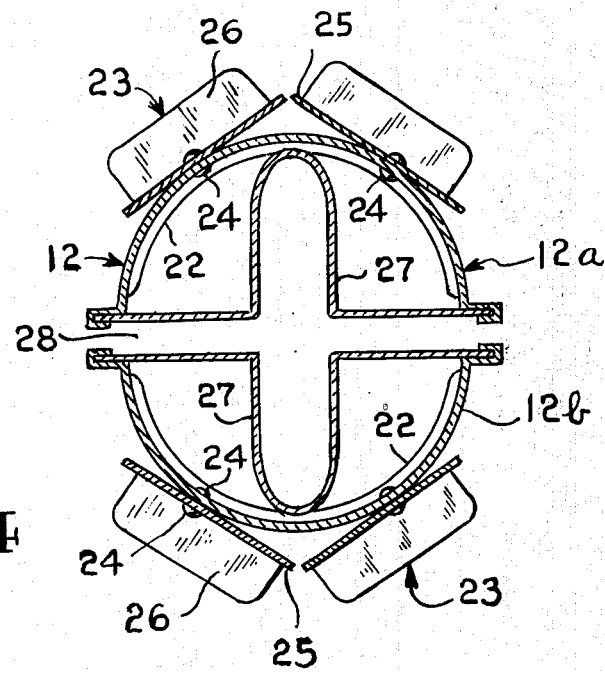
FIG. 4 is a section taken along the line 4—4 in a FIG. 3.

Each tubular element 12 comprises two substantially identical halves 12a and 12b (see FIG. 3) disposed in mirror-image relation and secured at their ends within the outer shell 11 by a frame 13 (see FIG. 2) inserted at either end of the shell 11 of the unit 10. This spaced relation of the halves 12a and 12b of the tubular element 12 insures maximum surface exposure thereof to the space or chamber enclosed by the shell 11 of the unit 10.

In a typical installation such as that shown diagrammatically in FIG. 1, the shell 11 of the unit 10 is provided with an inlet port 14 and an exhaust port 15. A supply A1 of gaseous media which, for purposes of illustration will be air, normally discharged to the atmosphere from any one of a variety of operations or manufacturing processes producing heat is introduced to the inlet port 14, passed internally of the shell 11 and exhausted to the atmosphere as spent air A2 through the exhaust port 15 by means of an exhaust fan 16 connected to the outlet duct 17.

Similarly, a gaseous media B1, in this case, air to be heated is introduced through the inlet port 18 of the unit 10. The air supply B1 which may comprise recirculated air supplemented by outside air is drawn through the shell 11 by means of a fan 19 connected to the exhaust port 20 as by means of the duct 21. It should be understood that the constituency as well as speed of the flow of both air streams A1 - A2 and B1 - B2 is readily capable of being controlled by any of several well known dampering or valving means (not shown) to achieve the maximum heat absorption by the air to be heated.

From the outlet end of the fan 19, the air supply B2 as ultimately constituted and heated is introduced into a room, building or work enclosure as may be required for creature comfort or for maintenance of prescribed work functions or both.

In the course of its passage through the tubular elements 12 within the shell 11 of the unit 10, the air supply B1 - B2 to be heated is brought into direct contact with the surfaces of the halves 12a and 12b of tubular elements 12. The tubular elements 12 are heated by conduction from the hot air supply A1 - A2 carried internally of the shell 11. Simultaneously the air supply B1 - B2 to be heated passing along and in contact with the walls of the tubular elements 12 is heated by convection therefrom as it moves from the inlet port 18 of the shell 11 toward its discharge from the exhaust fan 19.

In order to achieve the maximum contact of the hot air supply A1 - A2 with the halves 12a and 12b of the tubular elements 12, they are provided at spaced intervals along their longitudinal dimension with partially circumferential corrugations 22 projecting inwardly of the outer surfaces of said tubular elements 12. For the same purpose and in order to produce a more homogeneous heating effect in the air supply B1 - B2 to be heated, each of the halves 12a and 12b has spoilers 23 secured to the outer surface thereof as by rivets 24. The spoilers 23 are formed by punching metal strips 25 and bending the segments so cut to form baffles 26 in vertical spaced relation along the surface of the strips.

The spoilers 23 are intended to partially obstruct the free flow of the hot air supply A1 - A2 and thereby to insure its maximum contact with the walls of tubular elements 12. Normally, it is desirable for ease of fabrication and to provide optimum heat conducting properties, to form the halves 12a and 12b of the tubular elements 12 of aluminum.

As previously described, the halves 12a and 12b of the tubular elements 12 are supported at either end in generally parallel spaced relation to each other within the shell 11 by means of a frame 13 fitted into the inlet and outlet ports 18 and 20, respectively. Each of the halves 12a and 12b is formed with an inwardly extending convolution 27 which together with the space 28 between the said mirror-image halves provides an additional channel exposed to the hot air supply A1 - A2 as it passes longitudinally of the shell 11 of the unit 10.

The frames 13 recessed into the inlet and outlet ports 18 and 20, respectively, at the ends of the shell 11 are so formed that the projections 29 on cross bars 30 mate with the spaces 28 and the convolutions 27 of the several tubular elements 12 mounted in each shell 11. Preferably, to insure maximum sealing at the inlet and outlet ports 14 and 15 at the ends of the unit 10, a fire retardant sealant 31 such for example, as an epoxy compound, forms a positive seal for the ends of the unit 10 preventing intermingling of the hot air supply A1 - A2 and the air supply B1 - B2 to be heated. Thus, a chamber is formed internally of the shell 11 and surrounding the spaced tubular elements 12.

It will be readily apparent that the character and composition of the material of which the tubular elements 12 may be formed may vary depending upon the nature of the heated gaseous medium directed therethrough. As previously indicated, although it is preferable, because of its special heat conductive and ductile properties, to form the halves 12a and 12b of the tubular elements 12 of aluminum. However, if the hot air supply A1 - A2 or gases used to provide the heating contain corrosive fumes, acids or the like from a manufacturing process or are vapor laden, the tubular elements may be fabricated from galvanized or stainless steel. In the event that the hot air supply A1 - A2 carried internally of the shell 11 is excessively moisture laden, a suitable drain (not shown) can be provided to remove the condensate.

While only one of the preferred embodiments of the invention has been shown and described, it is contemplated that various changes and substitutions may be made without departing from the spirit or scope of the invention. It is desired that the invention be limited only to the extent defined by the accompanying claims.

We claim:

1. A heat exchanger comprising a shell having inlet and exhaust ports; a number of tubular elements disposed internally of and in spaced parallel relation to the longitudinal axis of the shell, each of said tubular elements embodying two substantially mirror-image halves characterized by substantially diametrically opposed inwardly extending convolutions; a frame member inserted to each end of the shell supporting the halves of the tubular elements in spaced relation to each other, said frame members having portions thereof mating with the space between the halves of the tubular elements and the convolutions therein; spoilers mounted externally of each of the halves of the tubular elements in tangential relation thereto and having baffles projecting therefrom in mutually staggered relation internally of the shell; a sealant in each frame cooperating therewith to form a fluid-tight chamber internally of the shell surrounding the tubular elements; and means for maintaining a flow of fluid through the tubular elements and through the chamber.

2. The heat exchanger of claim 1 wherein the outer surface of each of the halves of the tubular elements is provided with a number of inwardly extending partially circumferential corrugations extending transversely of and in spaced relation along the longitudinal dimension of said tubular elements.

* * * * *